| United States Patent [19] | [11] | 4,311,819 |
|---|---|---|
| Tung et al. | [45] | Jan. 19, 1982 |

[54] PREPARATION OF ALKENYL AROMATIC MONOMER BUTADIENE RUBBER

[75] Inventors: Lu H. Tung; Larry L. Kirkby; Charles E. Lyons, all of Midland, Mich.

[73] Assignee: The Dow Chemical Company, Midland, Mich.

[21] Appl. No.: 208,209

[22] Filed: Nov. 19, 1980

Related U.S. Application Data

[63] Continuation-in-part of Ser. No. 58,704, Jul. 18, 1979, abandoned.

[51] Int. Cl.³ ............................................. C08F 236/10
[52] U.S. Cl. ............................ 526/173; 260/33.6 A; 260/33.6 PQ; 260/33.6 UA; 525/243; 525/263; 525/316
[58] Field of Search ................ 526/173; 525/316, 243, 525/263; 260/33.6 A, 33.6 PQ, 33.6 UA

[56] References Cited

U.S. PATENT DOCUMENTS

| 3,317,918 | 5/1967 | Foster | 526/173 |
|---|---|---|---|
| 3,461,109 | 8/1969 | Hinton et al. | 526/173 |
| 3,464,961 | 9/1969 | Foster | 526/173 |
| 3,520,858 | 7/1970 | Bodnan et al. | 526/173 |
| 3,651,025 | 3/1972 | Bean et al. | 526/173 |

*Primary Examiner*—William F. Hamrock
*Attorney, Agent, or Firm*—R. B Ingraham

[57] ABSTRACT

Butadiene is partially polymerized anionically in the presence of styrene to form a styrene-butadiene rubber of low styrene content. The resultant living polymer is terminated, butadiene removed, and optionally the styrene polymerized with or without additional styrene to form impact resistant styrene polymer.

7 Claims, No Drawings

PREPARATION OF ALKENYL AROMATIC MONOMER BUTADIENE RUBBER

This application is a continuation-in-part of the copending application Ser. No. 58,704, filed July 18, 1979 now abandoned.

Solution polymerized butadiene polymers such as polybutadiene, styrene-butadiene polymer and like rubbery butadiene polymers prepared with a lithium based catalyst have been recognized as having highly desirable physical properties for a number of applications. The polymerization of butadiene polymers with lithium based catalyst is disclosed in U.S. Pat. No. 3,317,918, the teachings of which are incorporated by reference thereto. One end use for such butadiene polymer is in the reinforcement of styrene polymers and the preparation of impact resistant rubber reinforced molding and extrusion compositions. U.S. Pat. Nos. 3,264,374 and 3,976,721 disclose butadiene polymer reinforced polystyrene. Such butadiene polymers have been prepared by a variety of methods. However, for many purposes the lithium based catalyst provides a preferred product. The block polymerization of 1,3-butadiene is disclosed in U.S. Pat. No. 3,970,607 which employs a 1,2-diene as a reaction regulator to prevent excessive exotherm per unit of time during polymerization. Oftentimes such lithium initiated or solution polymerized rubbery butadiene polymers are available in the form of a solidlike rubbery mass or an extremely viscous liquid. In the preparation of a rubber reinforced alkenyl aromatic polymer such as polystyrene, they are dissolved in the styrene monomer and the resultant rubber solution with or without diluent, subsequently polymerized either by the mass polymerization technique or mass-suspension polymerization technique to give the desired impact resistant styrene polymer. The preparation of the alkenyl aromatic monomer rubber solution requires substantial equipment, labor and elapsed time. Oftentimes the rubber is provided in the form of bales. The bales must be unwrapped and often great care taken that none of the wrapping material remains on the bale. The bale of rubber is then fed to a chopping device which severs the bale into a plurality of irregular sticky particles which are delivered to a body of alkenyl aromatic monomer such as styrene, which is agitated until, at least hopefully, a uniform solution of rubber in monomer is obtained. The monomer rubber solution is oftentimes filtered and subsequently subjected to polymerization conditions.

It would be desirable if there were available an improved method for the preparation of rubbery butadiene polymer.

It would be desirable also if there were available an improved process for the preparation of alkenyl aromatic monomer-butadiene containing rubber solutions using alkenyl aromatic monomer as solvent.

It would be advantageous if such a process would not require handling of undissolved rubber.

These benefits and other advantages are achieved in a process for the preparation of a alkenyl aromatic butadiene rubbery polymer, the steps of the method comprising providing a solution comprising 80 to 30 parts by weight of alkenyl aromatic monomer 20 to 70 parts by weight of butadiene (advantageously from 75 to 35 parts by weight alkenyl aromatic monomer and 30 to 60 parts by weight butadiene), and up to 50 weight percent based on the total weight of the solution of a solvent which is generally inert under conditions of polymerization, initiating polymerization with a lithium based polymerization initiator until about 5 to about 30 weight percent of the combined weight of alkenyl aromatic monomer and butadiene has been converted to form a rubbery styrene-butadiene polymer, terminating the polymerization and separating unreacted butadiene therefrom.

In an advantageous embodiment of the invention polymerization is again initiated to induce polymerization of alkenyl aromatic monomer, or alkenyl aromatic monomer with a comonomer such as acrylonitrile, until the desired quantity of the alkenyl aromatic or alkenyl aromatic monomer and comonomer has been converted to alkenyl aromatic polymer, and subsequently isolating from the reaction mixture a alkenyl aromatic polymer reinforced with a rubbery alkenyl aromatic monomer butadiene polymer.

By the term alkenyl aromatic monomer is meant an alkenyl aromatic compound having the general formula

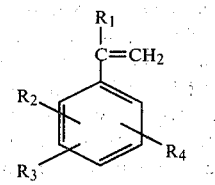

wherein $R_1$ is hydrogen or the methyl radical and $R_2$, $R_3$, $R_4$ are selected from the group consisting of hydrogen and alkyl radicals containing up to 10 carbon atoms with the further limitation that the total number of carbon atoms in $R_2$, $R_3$, and $R_4$ is not greater than 10. Examples of such monovinyl alkenyl aromatic monomers are styrene, vinyl toluene (all isomers) the paraisomer being preferred, α-methylstyrene, paratertiary butyl styrene, 3,4-dimethyl styrene, 2-ethylhexyl styrene (all isomers) n-decyl styrene (all isomers), n-butyl styrene.

Butadiene and alkenyl aromatic monomer used in the present invention should be generally free of active hydrogen compounds which would deactivate a lithium based catalyst.

Lithium based catalysts suitable for the practice of the present invention are set forth at length in U.S. Pat. No. 3,317,918, the teachings of which are herewith incorporated by reference thereto. Generally, from a standpoint of availability and convenience of handling, n-butyllithium is preferred.

Polymerization of the rubbery alkenyl aromatic-butadiene polymer in accordance with the present invention is advantageously conducted at a temperature between about 10° C. and 70° C. and preferably 30° C. to 50° C. Desirably such polymerization is conducted in a vessel equipped with an agitator and a reflux condenser which permits boiling of the butadiene to act as a heat transfer agent.

On polymerization in accordance with the present invention, it is essential that only relatively low conversion of the butadiene to rubbery polymer be permitted. The kinetics of polymerization are such that if the major portion of the butadiene is converted to polymer, the polymer is no longer rubbery because of excessive alkenyl aromatic monomer content. If the conversion of butadiene exceeds about 30 percent by weight of the butadiene, the possibility of thermal runaway, that is, uncontrolled rapid polymerization of the alkenyl aromatic monomer becomes very great. As the conversion of butadiene to polymer increases, so does the percentage of alkenyl aromatic monomer in the polymer increase, and the rubbery characteristics desired for reinforcement are lost. Termination of the lithium induced polymerization is readily accomplished by the addition of compounds which will donate a proton. Typically terminating compounds include water, methyl alcohol, ethyl alcohol, propyl alcohol, acetic acid, propionic acid and the like. Once the anionic polymerization has been terminated, desirably butadiene is removed from the system, generally by distillation with or without the use of subatmospheric pressure. The butadiene is readily condensed and may be used again. After the removal of the butadiene, free radical polymerization of the alkenyl aromatic monomer with agitation can be started either by the use of conventional free radical initiators such as peroxy compounds, azo compounds or combination of peroxy and azo, or alternatively free radical polymerization can be initiated thermally.

Butadiene rubbers prepared in accordance with the present invention have molecular weights from 30,000 grams per mole to about 700,000 grams per mole and contain from about 1 to 40 weight percent alkenyl aromatic monomer copolymerized therein. Advantageously, the rubbers contain from about 2 to 25 weight percent alkenyl aromatic monomer and preferably from 5 to 15 weight percent styrene when being used for reinforcing a styrene polymer matrix such as polystyrene or styrene-acrylonitrile copolymer.

Generally, the free radical polymerization is conducted at a temperature of from about 60° C. to about 170° C. Peroxy initiated free radical polymerization is generally conducted in the range of 60° C. to about 170° C. while thermal initiation is generally employed in the temperature range of from about 110° C. to about 170° C. During at least the initial portion of the polymerization of alkenyl aromatic monomer, agitation is desirable in order to obtain the preferred impact resistant polymers. Suitable equipment for such polymerization is set forth in U.S. Pat. No. 3,243,481, the teaching of which is herewith incorporated by reference thereto.

When polymerization of the alkenyl aromatic monomer has occurred to the desired degree, residual monomer is removed by heating the reaction mixture to a temperature of from about 180° C. to about 250° C. under a pressure of from about 0.10 to 100 millimeters of mercury and exposing as much surface of the reaction mixture as possible in a devolatilizing chamber and subsequently cooling the polymer. Such polymer is generally useful for extrusion and injection molding.

The invention is further illustrated but not limited by the following examples:

EXAMPLE 1

A one-liter round bottom flask is equipped with a dry ice cooled reflux condenser and an agitator. The vessel is provided with a nitrogen atmosphere and charged with 318 grams of purified styrene and 170 grams of purified butadiene. The contents of the flask were at ambient temperature (about 22° C.). The polymerization was initiated by the addition of 2 milliliters of a 0.523 normal solution of n-butyllithium in hexane. The polymerization temperature in the flask varied from about 14° C. to 24° C. and was governed by the refluxing rate of the butadiene from the reaction mixture. The polymerization was terminated 5 hours after the addition of the n-butyllithium by the addition of about 0.2 milliliters of n-propanol. The polymer was recovered by precipitation with methanol to yield 45.5 grams of a rubbery styrene-butadiene polymer. The yield was 9.3 weight percent based on the weight of the initial monomers. Gel permeation chromatography was employed to determine the molecular weight using both an ultraviolet and refractive index detectors. The molecular weight was 187,000 grams per mole and the polymer contained 14.9 percent styrene and 85.1 percent butadiene, percentages being weight percentages. Employing the reactivity ratios reported by Hsieh and Glaze (Rubber Chem. Tech., 43, 22, 1970), wherein the reactivity ratio for styrene was taken at 0.1 and that for butadiene as 12.5, the calculated composition was 14.5 percent styrene and 85.5 percent butadiene.

EXAMPLE 2

A two-liter reactor with agitator was flushed with nitrogen and charged with 554 grams of purified styrene and 677 grams of purified butadiene. Polymerization was initiated with 12.5 milliliters of 0.55 normal n-butyllithium in hexane solution. The reaction mixture was heated to 45° C. and heating discontinued. Dry ice was placed on the top of the reactor to condense butadiene vapors and thereby maintain the temperature of the contents below 50° C. One hour and 45 minutes after the addition of the n-butyllithium, polymerization was terminated by the addition of 5 milliliters of one normal ethyl-benzene solution of n-propanol. The reaction mixture was sampled and had a solids content of 21.6 weight percent. The molecular weight was determined using the apparatus of Example 1. The molecular weight was 322,000 grams per mole. The polymer contained 6.8 weight percent styrene, the remainder being butadiene. The reaction mixture was the admixed with 2 liters of styrene and the excess butadiene monomer removed by agitating the solution and applying vacuum thereto. 1123 Grams of the mixture consisting of 84 grams of styrene-butadiene rubbery polymer and 1039 grams of styrene was further diluted with an additional 228.5 grams of styrene. To this mixture was added 150 grams of ethylbenzene, 3.75 grams of mineral oil, 2.25 grams of stabilizer commercially available under the trade designation of Irganox 1076, 1.05 grams of alphamethylstyrene dimer and 3 grams of a 25 weight percent active solution of 1,1-di(tertiarybutylperoxy)-cyclohexane in ethylbenzene. 1200 Grams of the mixture was added to an agitated batch polymerization reactor wherein the temperature was raised from 110° C. to 160° C. over a period of 7 hours. After 4 hours an additional 200 grams of the feed mixture was added to the reactor. At the end of 7 hours heating was discontinued, the solids of the mixture were 72.1 weight percent. The mixture was poured into shallow pans and placed in a vacuum oven at a temperature of about 200° C. for a period of 90 minutes. The devolatilized polymer was removed from the shallow pans, ground to form a plurality of particles which were subsequently compression molded to provide samples for physical property determinations. The tensile strength at yield of the polymer was 2840 pounds per square inch; tensile strength at break 2965 pounds per square inch. The example showed 28.1 percent elongation at break. The notched Izod impact strength was 1.4 foot-pounds per inch of notch and the Vicat heat distortion temperature was 212° F. which are typical properties for conventional impact resistant polystyrene of like rubber content.

EXAMPLE 3

A plurality of rubbers were prepared employing the general procedure of Example 1 wherein the styrene-butadiene monomer ratio by weight was 65:35, varying quantities of toluene were employed as a diluent and the initial temperature and n-butyllithium concentration was varied as well as polymerization time. The results are set forth in Table I.

TABLE I

| Run # | % Toluene | Effective n-BuLi Conc. mmol/l | Initial Temp °C. | Max. Temp °C. | Length of Runs Hrs. | Conv. % | $M_w \times 10^{-3}$ | Copolymer % Styrene Cal. | Obs. |
|---|---|---|---|---|---|---|---|---|---|
| 3 | 50 | 0.39 | 40 | — | 1¼ | 24.7 | 307 | 18.1 | 18.9 |
| 4 | 22 | 0.76 | 23 | 38 | 3½ | 19.4 | 195 | 16.5 | 14.9 |
| 5 | 22 | 0.54 | 23 | 45 | 3 | 13.0 | 166 | 15.2 | 12.7 |
| 6 | 0 | 0.77 | 16 | 25 | 4½ | 11.8 | 142 | 15.0 | 12.2 |
| 7 | 10 | 0.24 | 18 | 28 | 5½ | 7.7 | 299 | 14.3 | 15.7 | n-BuLi = normal butyllithium
Temp = temperature
°C. = degrees Centigrade
Hrs. = hours
Conv. = conversion
$M_w$ = weight average molecular weight grams per mole
Sty. = styrene
Cal. = calculated
Obs. = observed In a manner similar to the foregoing examples, beneficial results are obtained when the styrene is replaced wholly or in part by one or more of the alkenyl aromatic monomers hereinbefore set forth.

As is apparent from the foregoing specification, the present invention is susceptible of being embodied with various alternations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of an alkenyl aromatic butadiene rubbery polymer, the steps of the method comprising providing a solution comprising 80 to 30 parts by weight of alkenyl aromatic monomer, 20 to 70 parts by weight of butadiene, and up to 50 weight percent based on the total weight of the solution of a solvent which is generally inert under conditions of polymerization, initiating polymerization with a lithium based polymerization initiator at a temperature of from about 10° to about 70° centigrade until about 5 to about 30 weight percent of the combined weight of alkenyl aromatic monomer and butadiene has been converted to form a rubbery alkenyl aromatic monomer-butadiene polymer containing from about 2 to about 25 weight percent styrene, terminating the polymerization and separating unreacted butadiene therefrom.

2. The process of claim 1 wherein the lithium based polymerization initiator is a butyllithium.

3. The method of claim 1 wherein polymerization is initiated at a temperature of from about 30° C. to about 50° C.

4. The method of claim 1 wherein at least a portion of heat generated by polymerization of the butadiene is removed by refluxing butadiene.

5. A process of claim 1 wherein the monovinyl aromatic monomer is styrene.

6. The process of claim 4 including the step of adding styrene to the reaction mixture after the polymerization has been terminated.

7. A process for the preparation of a styrene-butadiene rubbery polymer, the steps of the method comprising providing a solution comprised of 80 to 30 parts by weight of styrene, 20 to 70 parts by weight of butadiene and up to 50 percent based on the total weight of the solution of a solvent which is generally inert under the conditions of polymerization, initiating polymerization with a lithium based polymerization initiator and polymerizing styrene and butadiene at a temperature of from about 10° to about 70° centigrade until about 5 to about 30 weight percent of the combined weight of styrene and butadiene has been converted to form a rubbery styrene-butadiene polymer containing from about 2 to 25 weight percent styrene, the remainder being butadiene polymerized therein, the butadiene-styrene polymer having a molecular weight of from about 30,000 to 700,000 gram moles including the step of removing at least a portion of heat generated by polymerization by refluxing the butadiene and subsequently separating unreacted butadiene therefrom.

* * * * *